No. 861,717. PATENTED JULY 30, 1907.
H. FRANKEL.
SPLICING SLEEVE.
APPLICATION FILED MAR. 14, 1907.

Witnesses:

Inventor
HARRY FRANKEL
By his Attorneys

UNITED STATES PATENT OFFICE.

HARRY FRANKEL, OF NEW YORK, N. Y.

SPLICING-SLEEVE.

No. 861,717.

Specification of Letters Patent.

Patented July 30, 1907.

Application filed March 14, 1907. Serial No. 362,285.

*To all whom it may concern:*

Be it known that I, HARRY FRANKEL, a citizen of the United States, residing in the city, county, and State of New York, have invented certain new and useful Improvements in Splicing-Sleeves, of which the following is a full, clear, and exact description.

My invention relates to splicing sleeves for wires and the like, and is particularly useful in connection with overhead trolley wires.

The object of the invention is to provide a simple and effective means to join the ends of sections of trolley wires in constructing the line, as well as a means whereby a broken trolley wire can be quickly repaired, the two ends being securely held in such a manner and by such means that the circuit is unimpaired and interference with the trolley wheel is prevented. It is in this connection that I have illustrated my invention herein.

Figure 1:
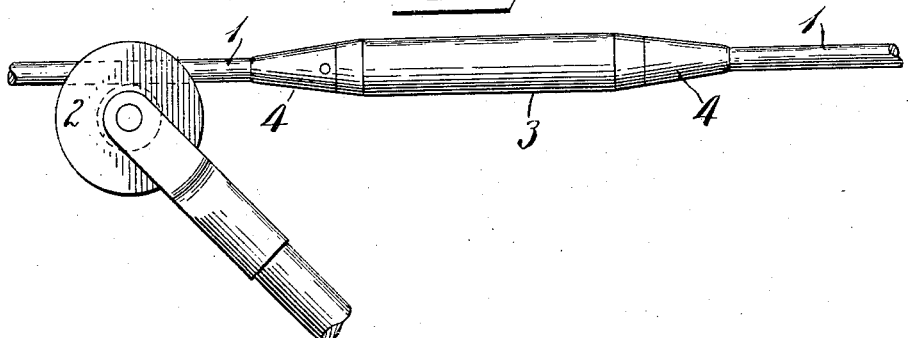
Figure 2:
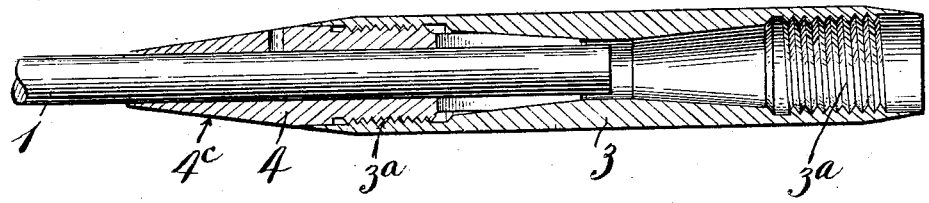
Figure 3:
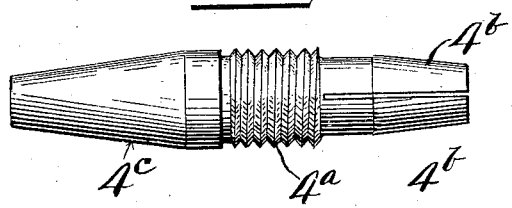
Figure 4:
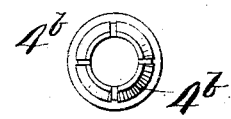

In the drawings, Figure 1 represents my invention as applied to a broken trolley wire, said view being a side elevation and showing an approaching trolley wheel. Fig. 2 is a relatively enlarged-longitudinal section, one of the parts being removed. Fig. 3 is a side elevation of one of the parts detached. Fig. 4 is an end view of the part shown in Fig. 3, looking from right to left.

1—1 represent two ends of a trolley wire. 2 is the trolley wheel bearing against the same in the usual manner. In Fig. 1 the splicing sleeve is shown in place holding these two ends in firm embrace. The splicing sleeve comprises the main body 3 of tubular form, having a passage therethrough and two end pieces 4—4. The details of construction are best seen in the sectional views. In the particular form shown, the end pieces 4 are provided with the screw-thread $4^a$. The main body of the sleeve has a tapered inner wall arranged to receive the jaws $4^b$ $4^b$ and a screw-threaded portion $3^a$ arranged to receive the screw-threads $4^a$. The part $4^c$ may be given a long taper to provide an easy incline up which the trolley wheel 2 may ride to avoid arcing. This incline forms a substantially continuous surface with the surface of the body 3. It is preferable to have the screw-threads at one end of the body 1 right handed, while at the other end left handed.

In Fig. 2 I have shown the main body 3 with one end piece and one end of the wire in place. In actual practice, of course, the two ends of the wire should be inserted simultaneously and then the body 3 would be screwed up so as to draw in the end pieces 4 to cause the jaw portions thereof to contract tightly upon the wire. It is preferable in making the connection that the two ends of the wire should be brought into tight contact before this setting-up operation takes place, with the result that when so assembled the drawing toward each other of the end pieces 4 will, as soon as the gripping jaws begin to take hold, force the ends of the wire into more firm, positive and permanent contact than could be attained by hand, or by means of any ordinary splice. Any suitable tools may be employed for gripping the several parts during the turning-up operation. It is preferable that the exposed surfaces of the various parts should be smooth, as distinguished from angular or broken, although one or more holes might be formed transversely in the several parts to receive gripping devices, such as spanners.

It should be understood I have described only a preferred form of my invention, and that some changes might be made therein without departing from the scope thereof.

What I claim is:

1. A splicing sleeve, comprising a main body portion, a passage therein, a screw-thread in said passage, a tapered portion beyond said screw-thread, a removable end piece, a yielding tapered jaw at the inner end of said end piece adapted to the tapered portion of the sleeve, an intermediate threaded portion on said end piece adapted to the screw-threaded portion of the sleeve, the external portion of said end piece being tapered.

2. A splicing sleeve comprising a main body portion, a passage therethrough, a screw-thread within and near each end of said passage, one screw-thread being right-hand, the other left-hand, oppositely arranged tapered portions between the screw-threaded portions of said sleeve, removable end pieces for said sleeve, each end piece including a yielding tapered jaw at its inner end adapted to the tapered portion of the sleeve, a screw-thread intermediate the length of the end piece adapted to the screw-thread in its respective end of the sleeve, the external portion of each end piece being tapered.

HARRY FRANKEL.

Witnesses:
 LANGDON MOORE,
 ALICE MORFORD.